March 6, 1951 — C. G. VOKES — 2,544,244
FILTER
Filed July 14, 1947
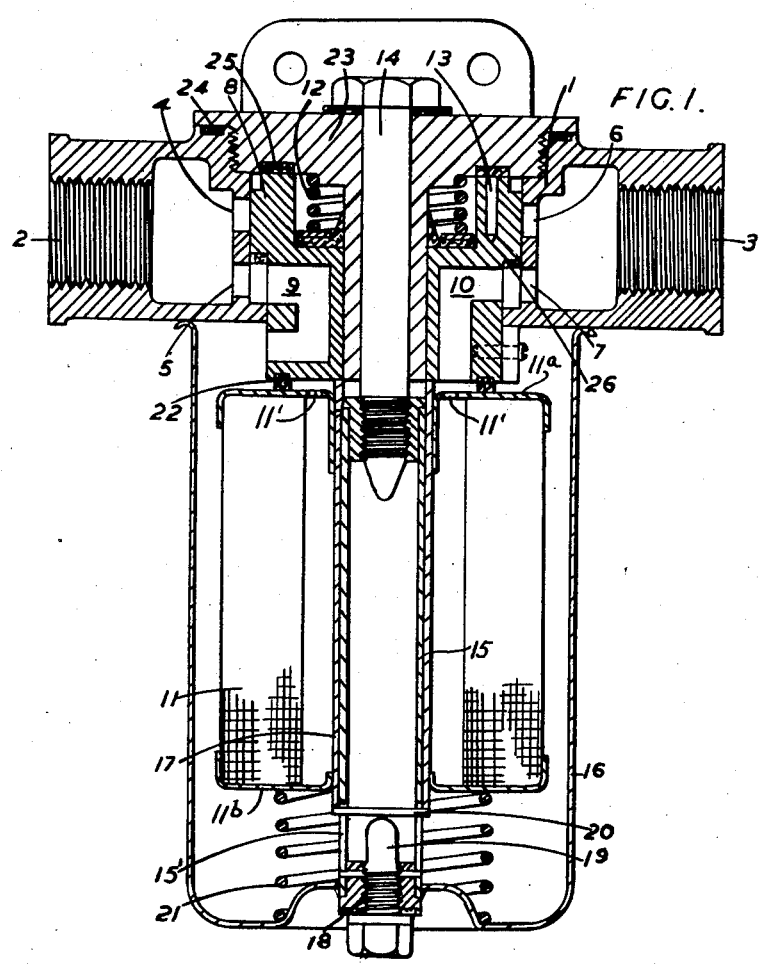
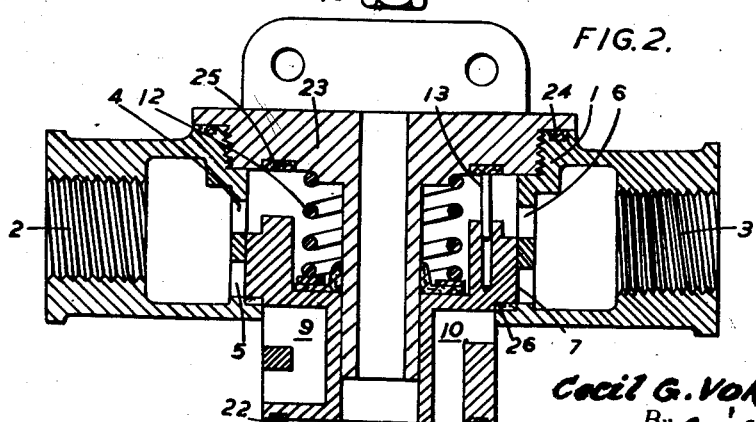
Inventor
Cecil G. Vokes
By
Attorney Patented Mar. 6, 1951

2,544,244

UNITED STATES PATENT OFFICE 2,544,244

FILTER

Cecil Gordon Vokes, Guildford, England, assignor to Vokes Limited, Guildford, England Application July 14, 1947, Serial No. 760,711
In Great Britain July 29, 1946

4 Claims. (Cl. 210—166)

This invention relates to filters and especially though not essentially to filters for insertion in a pipe line such as are used to supply oil to the bearings or the like of internal combustion engines.

An object of the invention is to provide a filter of which the element may be removed for servicing or cleaning without interruption to the flow of fluid in the system.

From one aspect, the invention provides a filter having a valve incorporated in the filter head which when the filter element is in filtrating position directs the fluid through the filter element, this valve before removal of the filter case being moved to an alternative position in which it directs the fluid from the inlet to the outlet and obturates the passages from the head to the filter case.

From another aspect, the invention provides in a filter head, a valve having alternative positions in which it allows fluid to pass either from the inlet to the outlet or from the inlet through the filter element to the outlet and the valve is spring loaded towards the first of these positions but is normally maintained in the second position by means which retain the filter element in its operative position. These retaining means may for example comprise a plug in the enclosing pot of the filter which presses a valve actuating tube against the valve and which also closes a drain hole in the pot, the pot being retained in position by a central bolt or the like.

Other parts of the invention are embodied in the preferred form which will now be described in some detail by way of example with reference to the accompanying drawings in which—

Fig. 1 is a vertical section through the center of a pipe line filter,

Fig. 2 is a similar view of the upper part of the filter shown in Fig. 1 with a valve in the alternative position.

In this form, the head 1 of the filter is formed with inlet and outlet passages 2 and 3 adapted for connection in the pipe line for supplying fluid. A central annular chamber in the head has ports connecting with the inlet and outlet passages, there being two ports 4, 5 and 6, 7 situated one above the other in connection with each passage.

Within this annular chamber is slidably mounted a valve body 8 which is so arranged that in one position passages 9 and 10 in the body align with one set of ports 5 and 7 and connect the inlet and the outlet to opposite sides of the filter element, while the other set of ports 4 and 6 is obturated. This position will hereinafter be referred to as the normal position since it is that appropriate to the use of the filter for filtration. In the other position of the valve body illustrated in Fig. 2 (hereinafter referred to as the "closed" position) the passages leading to and from the filter element are out of alignment with the first set of ports 5 and 7 which are closed by the valve body 8; the other set of ports 4 and 6 are open and fluid can flow freely from the inlet to the central chamber above the valve body and so to the outlet. In this position the filter element 11 can be removed without interrupting the flow of fluid in the system and without undue loss of fluid.

The valve body is pressed towards the closed position by a helical spring 12 and is guided in its movement from one position to the other by guide pins 13 fixed in the valve head which also prevent rotation of the valve in the head.

A bolt 14 running centrally through the valve head engages the internally threaded end of a central tube 15 connected to the pot 16 and forces the pot into fluid-tight relationship with the head.

The filter element 11, which is preferably star-shaped and formed of pleated textile fabric and gauze supported between end plates 11a and 11b, the upper 11a of which has the usual outlet openings 11', is slidably mounted on a tube 17 which slides on the central tube 15. A drain plug 18 in the bottom of the pot has an extension 19 which engages a bar 20 that rides in slots 15' longitudinally in the central tube 15 and extends across the end of the actuating tube 17 which engages the bottom of the valve 8, holding the valve in the normal position. The filter element is pressed upward by a spring 21 in the base of the pot against the valve body, a washer 22 of suitable material providing a seal between the filter element and the valve body. The filter spring 21 is weaker than the valve spring 12 so that it may be overcome by the valve spring when the drain plug 18 is removed.

When the drain plug 18 is removed, the valve body 8 will be pressed by its spring to the closed position obturating the passages 5 and 7 to and from the filter and opening the connection between the inlet 2 and outlet 3. The bolt 14 may then be withdrawn and the pot 16 removed to obtain access to the filter element, the flow of fluid through the system continuing meanwhile.

When the filter has been serviced, it can be replaced, and the bolt 14 inserted to draw the pot into position against the head. Insertion of the drain plug 18 then moves the actuating tube 17 into position against the valve body and moves the valve body into its normal position where the fluid is directed through the filter element.

The assembly and removal of the valve 8 and spring 12 is accomplished through a threaded aperture in the top of the head 1. This aperture is normally closed by means of a screwed plug cap 23. A washer 24 of suitable material inset in the head 1 provides a fluid-tight joint; and a washer 25 inset in the bottom of the plug cap 23 provides an upper seating for the valve 8.

A washer 26 inset in the body of the valve 8 forms a fluid-tight joint with the head 1 in the lower position of the valve.

It will be understood that the invention is not restricted to the details of the preferred form described which may be modified without departing from the broad ideas underlying it.

I claim:

1. A filter comprising, in combination, a head including an inlet and outlet separated by a valve chamber opening through said head, ports between said chamber and said inlet and outlet respectively, a valve movable in said chamber relative to said ports and spanning said opening, two passages through said valve for communication between said opening and said ports respectively, a spring in said chamber biasing said valve to interrupt the communication of said valve passages and place said ports in direct communication, a pot removably mounted to said head and enclosing said opening, an opening in the bottom of said pot, a shaft that is hollow at its bottom end and rigidly fixed to said pot with its bottom end coinciding wih said pot opening, diametrically opposed slots in said hollow bottom and above the end thereof to provide drainage communication from said pot through said bottom end, a sleeve surrounding said shaft for engagement with said valve and having a cross-pin secured to its bottom end with said pin extending through said slots, a filter element mounted on said sleeve for engagement with said valve between said passages to filter the communication through said pot between said passages, and a drain plug removably mounted in the hollow bottom end of said shaft to close said pot opening and with the upper end of said plug engaging said pin to lift said sleeve against said valve to bias said valve against the action of said spring and interrupt direct communication between said ports and open communication through said passages.

2. A filter as defined in claim 1 wherein said filter element is slidably mounted on said sleeve, and a spring in said pot biases said filter element against said valve.

3. A filter as defined in claim 2 wherein said valve spring is stronger than said filter spring to actuate said valve in opposition to said filter spring.

4. A filter as defined in claim 1 wherein the upper end of said shaft is internally threaded, and a bolt extends through said head and is threaded into the upper end of said shaft to retain said pot against said head.

CECIL GORDON VOKES.

REFERENCES CITED

The following references are of record in the file of this patent:

UNITED STATES PATENTS

| Number | Name | Date |
| --- | --- | --- |
| 502,583 | Rankine | Aug. 1, 1893 |
| 922,657 | Worsey | May 25, 1909 |
| 1,062,236 | Hitchcock | May 20, 1913 |
| 2,056,756 | Wiedhofft | Oct. 6, 1936 |

FOREIGN PATENTS

| Number | Country | Date |
| --- | --- | --- |
| 500,992 | Germany | June 28, 1929 |
| 524,066 | Great Britain | July 29, 1940 |